(12) United States Patent
Wu et al.

(10) Patent No.: US 11,976,492 B2
(45) Date of Patent: May 7, 2024

(54) POWERED STEREO GARAGE WITHOUT CABLE ON PARKING SPACE

(71) Applicant: Hangzhou Dazhong Boao Technology Co., Ltd., Hangzhou (CN)

(72) Inventors: Yanzheng Wu, Hangzhou (CN); Shuilong Zheng, Hangzhou (CN)

(73) Assignee: Hangzhou Dazhong Boao Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/823,802

(22) Filed: Aug. 31, 2022

(65) Prior Publication Data

US 2023/0323696 A1 Oct. 12, 2023

(30) Foreign Application Priority Data

Mar. 25, 2022 (CN) .......................... 202210302306.7

(51) Int. Cl.
*E04H 6/20* (2006.01)
*B65G 13/04* (2006.01)
*B65G 13/07* (2006.01)

(52) U.S. Cl.
CPC .............. *E04H 6/20* (2013.01); *B65G 13/04* (2013.01); *B65G 13/07* (2013.01)

(58) Field of Classification Search
CPC .... E04H 6/20; E04H 6/22; E04H 6/30; E04H 6/32; E04H 6/34; E04H 6/422; E04H 6/424; B65G 13/04; B65G 13/07; B65G 1/0421; B65G 54/02; B60L 5/38

USPC ....... 414/227, 232, 234, 239, 241, 242, 253, 414/245

See application file for complete search history.

(56) References Cited

U.S. PATENT DOCUMENTS

| | | | | |
|---|---|---|---|---|
| 3,171,551 | A * | 3/1965 | Stirling | E04H 6/422 414/253 |
| 3,880,264 | A * | 4/1975 | Corkum | B60M 1/30 191/48 |
| 7,997,848 | B2 * | 8/2011 | Valli | E04H 6/186 414/253 |
| 9,764,900 | B2 * | 9/2017 | Grosse | B60L 5/40 |
| 2011/0182703 | A1 * | 7/2011 | Alan | E04H 6/422 414/231 |
| 2018/0170365 | A1 * | 6/2018 | Shani | B60W 30/06 |

* cited by examiner

*Primary Examiner* — Glenn F Myers
(74) *Attorney, Agent, or Firm* — Schwegman Lundberg & Woessner, P.A.

(57) ABSTRACT

A powered stereo garage without cables on a parking space is disclosed, which includes a conveyor, a guide rail, a parking mechanism, a collector bush and a collector rail. The conveyor is arranged on the guide rail, and the parking mechanism is arranged at a periphery of the guide rail. The collector rail is arranged on the guide rail, the collector brush is provided on the conveyor, and the collector rail on the guide rail is electrically connected with the parking mechanism and the collector brush on the conveyor is electrically connected with a control box on the conveyor. The disclosure can supply power to the electric devices in the parking space according to parking or picking up demands, without laying a large number of cables in the garage to supply power to the electric devices in each of the parking spaces, and with improved fire safety.

10 Claims, 5 Drawing Sheets

POWERED STEREO GARAGE WITHOUT CABLE ON PARKING SPACE

CROSS REFERENCE TO RELATED APPLICATION

This Non-provisional application claims priority under 35 U.S.C. § 119(a) to Chinese Patent Application No. 202210302306.7, filed on 25 Mar. 2022, the entire contents of which is hereby incorporated by reference in its entirety.

TECHNICAL FIELD

The disclosure relates to a field of stereo garage equipment, in particular to a powered stereo garage without cables on a parking space.

BACKGROUND ART

Nowadays, stereo garages have been built in many places, and many parking spaces are provided in the stereo garages. Many electrical devices such as rollertable motors and sensors are needed to be installed on the parking spaces so as to ensure that cars can be smoothly brought in and out of the parking spaces. In order to supply power to these electrical devices, a large number of cables are needed to be laid in the stereo garages, which is costly for construction on the one hand, and on the other hand causes fire in the whole stereo garage as long as one of the cables fails to catch fire, and more laid cables further increase fire hazard.

SUMMARY

In view of above problems, a powered stereo garage without cables on a parking space is provided in the disclosure.

Technical schemes adopted in the disclosure are as follows.

A powered stereo garage without cables on a parking space includes a conveyor, a guide rail and a parking mechanism. At least two guide rails are arranged in parallel, the conveyor is arranged on the guide rail, and the parking mechanism is arranged at a periphery of the guide rail. The powered stereo garage without cables on the parking space further includes a collector rail and the collector rail is arranged on the guide rail. A collector brush is provided on the conveyor and the collector rail on the guide rail is electrically connected with the parking mechanism; and the collector brush on the conveyor is electrically connected with a control box on the conveyor.

Specifically, in the stereo garage, the parking space is arranged at a side of the guide rail, and the parking mechanism is located in the parking space. When in use, with the collector rail being arranged on the guide rail, the collector brush being arranged on the conveyor, the control box on the conveyor being connected with a power supply, and the control box on the conveyor being connected with an external power supply, the collector brush on the conveyor is abutted with the collector rail on the guide rail when the conveyor reaches a respective parking space, so that the collector brush on the conveyor and the collector rail on the guide rail foim a conductive circuit, and in this way, power can be supplied to the devices needing electricity in the parking mechanism by using a power cable connected with the control box. Therefore, the electric brush is adopted in the garage according to the disclosure to supply power to the electric devices in the parking space according to parking or picking up demands, without laying a large number of cables in the garage to supply power to the electric devices in each of the parking spaces, and with improved fire safety.

Optionally, the stereo garage further includes a guide roller assembly, and both the parking mechanism and the conveyor include the guide roller assembly.

Specifically, the guide roller assembly serves to transfer vehicles, and the parking mechanism includes two guide roller assemblies, which are linked by a shaft or other linkage member. There are also two guide roller assemblies on the conveyor.

Optionally, the guide roller assembly includes a frame, a guide roller and a rollertable motor. The guide roller is rotatably mounted on the frame, and two adjacent guide rollers are matched with each other by a chain and a sprocket, and the rollertable motor is matched with the guide roller.

Specifically, a plurality of guide rollers is installed on the frame, and the guide rollers are parallel to each other, and two adjacent guide rollers are linked by the chain and the sprocket, so the rollertable motor can drive all of the guide rollers on the guide roller assembly to rotate only with one of the guide rollers being matched. When the guide roller assembly is arranged on a parking space and used as a parking mechanism, two guide roller assemblies are linked by a shaft, and one of the two guide roller assemblies is provided with a rollertable motor while the other of the two guide roller assemblies is not provided with a rollertable motor. Each of the two guide roller assemblies on the conveyor is provided with a rollertable motor.

Optionally, the conveyor includes a rack, a guide wheel and a traveling wheel. The guide wheel and the traveling wheel are both rotatably mounted on the rack, and are both matched with the guide rail.

The traveling wheel serves to ensure that the rack can travel on the guide rail, while the guide wheel serves to cause the rack to move along the guide rail, so as to ensure that no deflection occurs to the rack in moving along the guide rail.

Optionally, the stereo garage further includes a traveling motor. The traveling motor is installed on the rack, and a part of traveling wheels are matched with the traveling motor.

The traveling motor is provided to drive the traveling wheels to move. Specifically, a part of the traveling wheels are connected with a coupling, and the coupling is matched with the traveling motor, so that the traveling motor drives the traveling wheels to rotate, and the rack moves along the guide rail. A traveling wheel matched with the traveling motor is a driving traveling wheel, while traveling wheels not matched with the traveling motor are driven traveling wheels.

Optionally, the stereo garage further includes a lead-in plate, which is arranged on the guide rail, and both ends of the collector rail are provided with the lead-in plate.

The lead-in plate is arranged at both ends of the collector rail and functions to guide, so that the collector brush can smoothly slide to a position to contact with the collector rail.

Specifically, the lead-in plate is provided with a lead-in groove, and a notch of the lead-in groove is trumpet-shaped, so that the collector brush can smoothly slide into the lead-in groove of the lead-in plate, and it can be avoided that the collector brush cannot slide into the lead-in groove.

Optionally, the stereo garage further includes a current detector, which is electrically connected with the collector brush.

The current detector is provided to detect whether there is current flowing through the collector brush. Because when the collector brush contacts with the collector rail, there will be current between the collector brush and the collector rail, so it can be judged whether the collector brush is in a conductive state with the collector rail by providing the current detector. Specifically, the current detector can be disposed in the control box so as to ensure reliability of the current detector in operation, which can play a certain protective role for the current detector and prevent damage to the current detector.

Optionally, there are two guide rails, and each of the guide rails is provided with a plurality of collector rails, and each of the collector rails is electrically connected with a parking mechanism.

With two guide rails being arranged in a parallel state, it is sufficient to ensure stable moving of the conveyor. A plurality of parking spaces are provided at a side of each of the guide rails, each of the parking spaces is provided with the parking mechanism, and electrical devices of a respective parking mechanism are connected with the collector rail through wires.

The disclosure has following beneficial effects. Power can be supplied to the electric devices in the parking space according to parking or picking up demands, without laying a large number of cables in the garage to supply power to the electric devices in each of the parking spaces, and with improved fire safety.

Reference numbers in the figures are as follows: 1. Guide Rail; 2. Lead-in Plate; 201. Lead-in Groove; 3. Collector Rail; 4. Guide Wheel; 501. Driven Traveling Wheel; 502. Driving Traveling Wheel; 6. Frame; 7. Guide roller; 8. Rollertable Motor; 9. Collector Brush; 10. Control Box; 11. Traveling Motor; 12. Rack; 13. Shaft.

DETAILED DESCRIPTION

The present disclosure will be described in detail with reference to the accompanying drawings.

Figure 1:
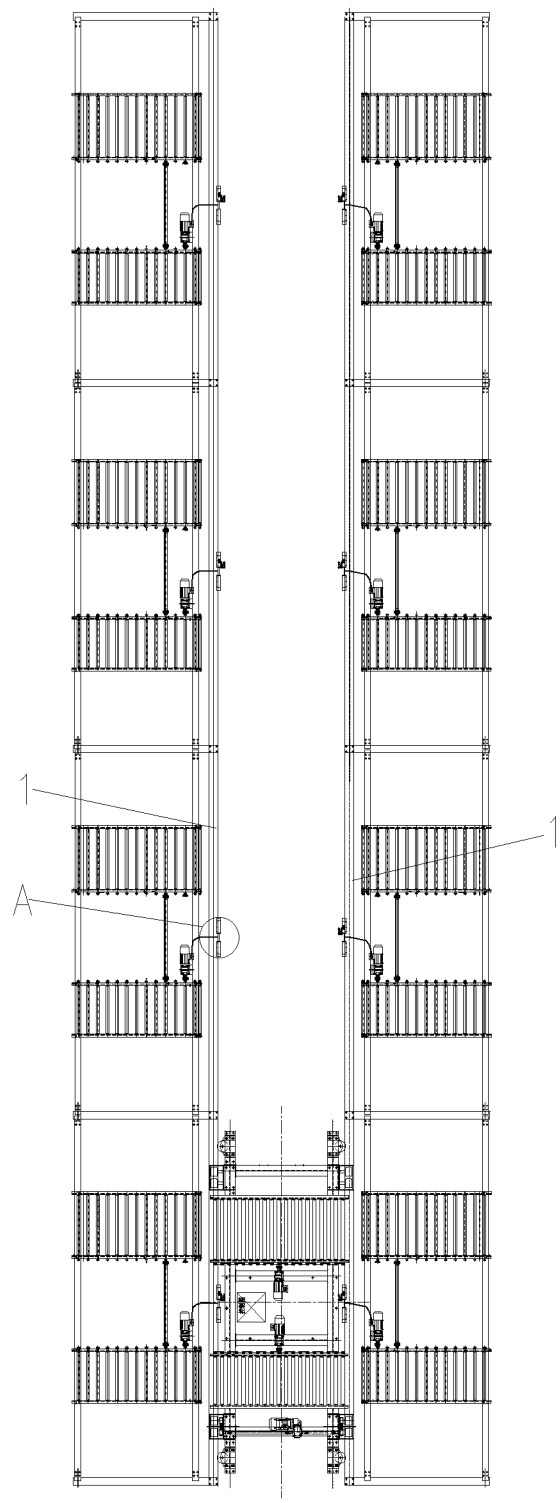
FIG. 1 is a schematic diagram of a powered stereo garage without cables on a parking space according to this disclosure.
Figure 2:
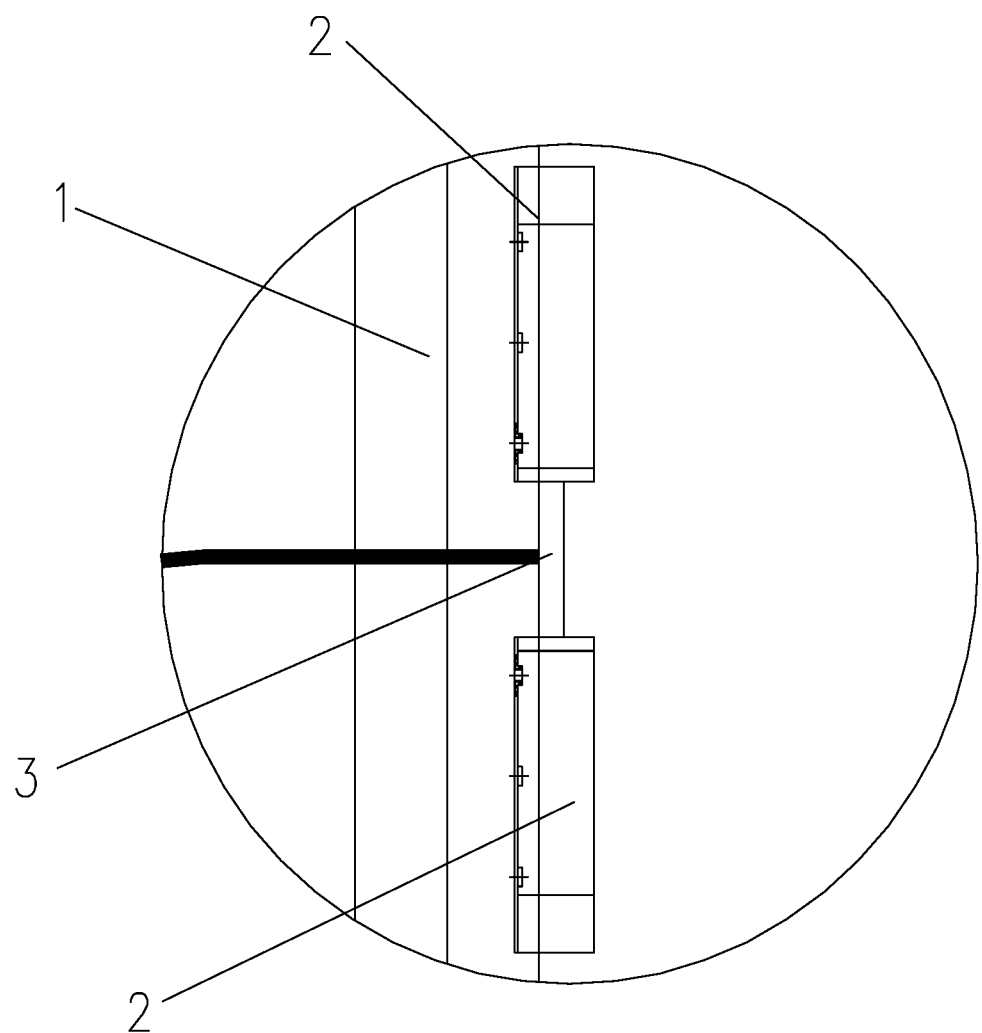
FIG. 2 is an enlarged schematic diagram at A in FIG. 1.
Figure 3:
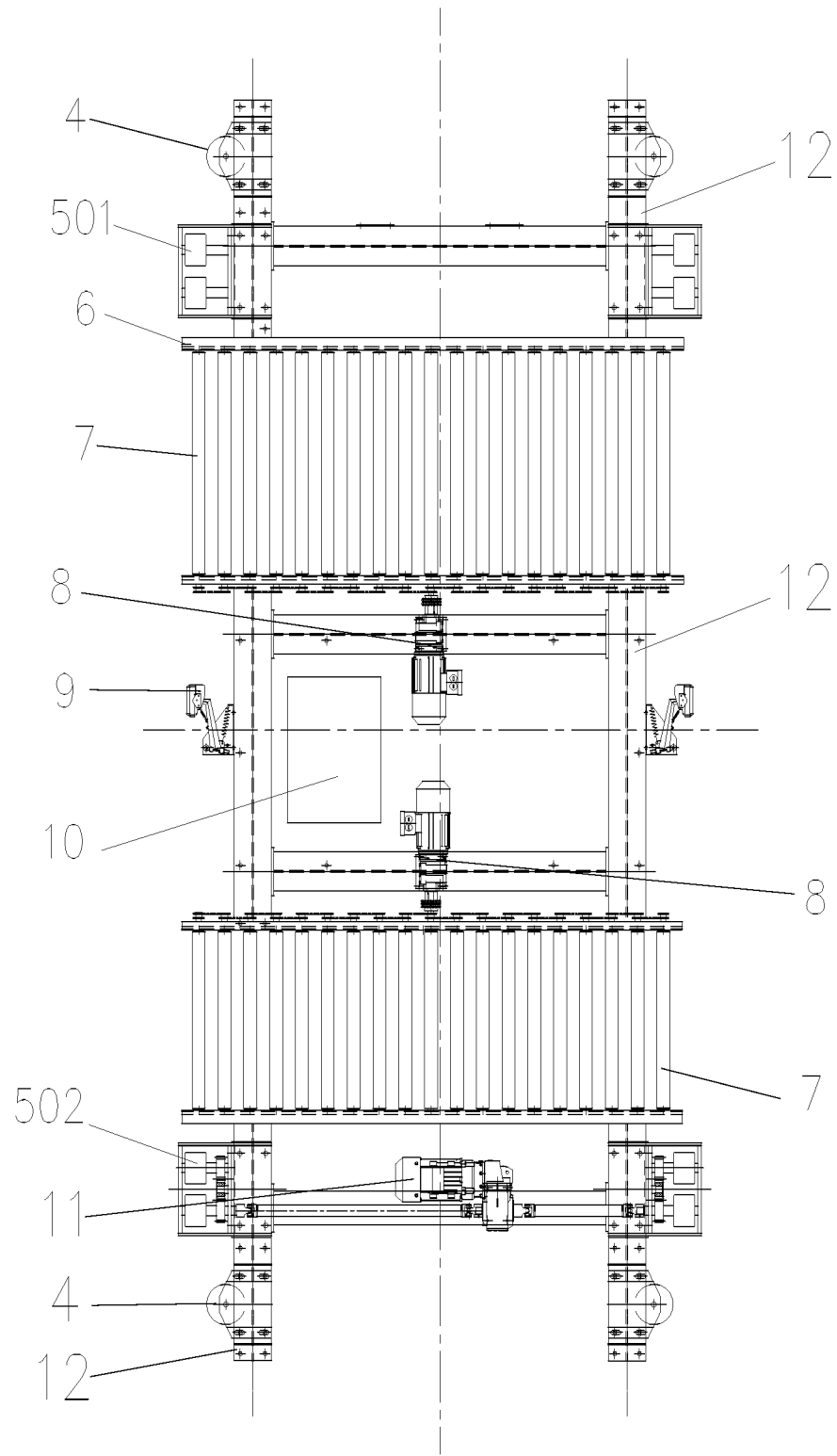
FIG. 3 is a schematic diagram of a structure of a conveyor according to this disclosure.
Figure 4:
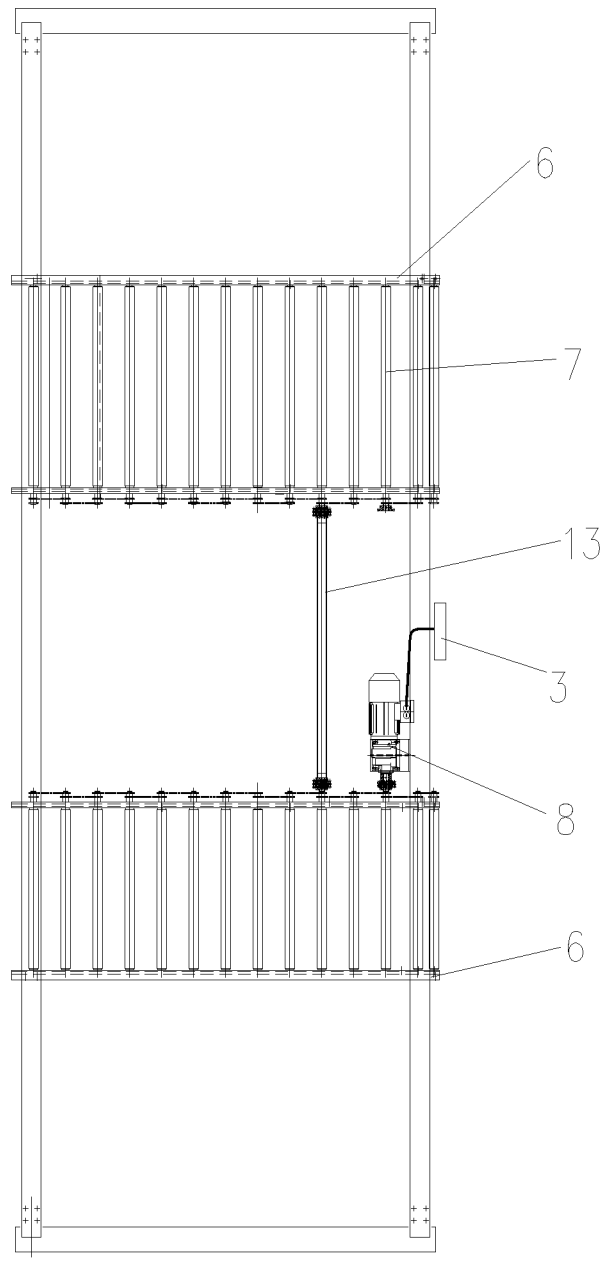
FIG. 4 is a schematic diagram of a structure of a parking mechanism according to this disclosure.
Figure 5:
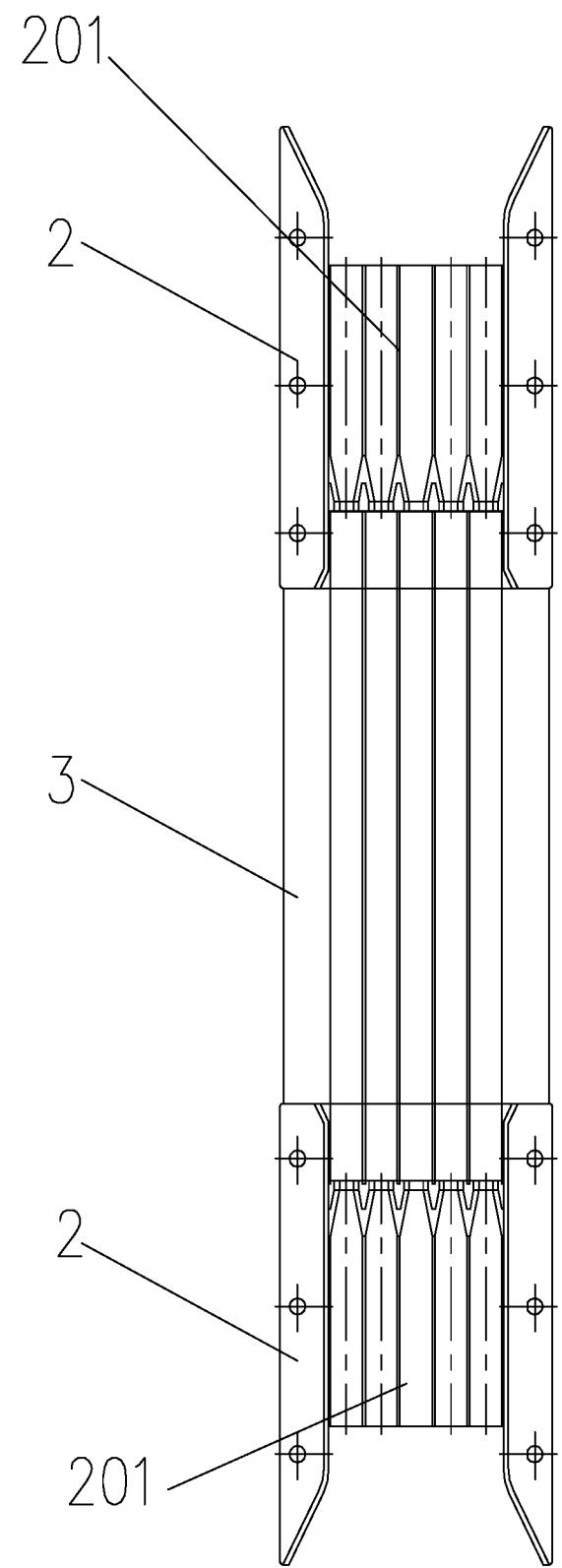
FIG. 5 is a schematic diagram of a matching relationship between a collector rail and a lead-in plate according to this disclosure.

As shown in FIGS. 1, 2, 3, 4 and 5, a powered stereo garage without cables on a parking space includes a conveyor, a guide rail 1 and a parking mechanism. At least two guide rails 1 are arranged in parallel, the conveyor is arranged on the guide rail 1, and the parking mechanism is arranged at a periphery of the guide rail 1. The stereo garage further includes a collector rail 3 and the collector rail 3 is arranged on the guide rail 1. A collector brush 9 is provided on the conveyor and the collector rail 3 on the guide rail 1 is electrically connected with the parking mechanism; and the collector brush 9 on the conveyor is electrically connected with a control box 10 on the conveyor.

Specifically, in the stereo garage, the parking space is arranged at a side of the guide rail 1, and the parking mechanism is located in the parking space. When in use, with the collector rail 3 being arranged on the guide rail 1, the collector brush 9 being arranged on the conveyor, the control box 10 on the conveyor being connected with a power supply, and the control box 10 on the conveyor being connected with an external power supply, the collector brush 9 on the conveyor is abutted with the collector rail 3 on the guide rail 1 when the conveyor reaches a respective parking space, so that the collector brush 9 on the conveyor and the collector rail 3 on the guide rail 1 form a conductive circuit, and in this way, power can be supplied to the devices needing electricity in the parking mechanism by using a power cable connected with the control box 10. Therefore, the electric brush 9 is adopted in the garage according to the disclosure to supply power to the electric devices in the parking space according to parking or picking up demands, without laying a large number of cables in the garage to supply power to the electric devices in each of the parking spaces, and with improved fire safety.

As shown in FIGS. 1, 2, 3, 4 and 5, the stereo garage further includes a guide roller assembly, and both the parking mechanism and the conveyor include the guide roller assembly. The guide roller assembly serves to transfer vehicles, and the parking mechanism includes two guide roller assemblies, which are linked by a shaft 13 or other linkage member. There are also two guide roller assemblies on the conveyor.

As shown in FIGS. 1, 2, 3, 4 and 5, the guide roller assembly includes a frame 6, a guide roller 7 and a rollertable motor 8. The guide roller 7 is rotatably mounted on the frame 6, and two adjacent guide rollers 7 are matched with each other by a chain and a sprocket, and the rollertable motor 8 is matched with the guide roller 7.

Specifically, a plurality of guide rollers 7 are installed on the frame 6, and the guide rollers 7 are parallel to each other, and two adjacent guide rollers 7 are linked by the chain and the sprocket, so the rollertable motor 8 can drive all of the guide rollers 7 on the guide roller assembly to rotate only with one of the guide rollers 7 being matched. When the guide roller assembly is arranged on a parking space and used as a parking mechanism, two guide roller assemblies are linked by a shaft 13, and one of the two guide roller assemblies is provided with a rollertable motor 8 while the other of the two guide roller assemblies is not provided with a rollertable motor 8. The two guide roller assemblies on the conveyor are respectively provided with the rollertable motor 8, so that the conveyor can provide a greater driving force in transferring vehicles and adjustment can be made to the vehicles.

As shown in FIGS. 1, 2, 3, 4 and 5, the conveyor includes a rack 12, a guide wheel 4 and a traveling wheel 501, 502. The guide wheel 4 and the traveling wheel 501, 502 are both rotatably mounted on the rack 12, and are both matched with the guide rail 1.

The traveling wheel 501, 502 serves to ensure that the rack 12 can travel on the guide rail 1, while the guide wheel 4 serves to cause the rack 12 to move along the guide rail 1, so as to ensure that no deflection occurs to the rack 12 in moving along the guide rail 1. A rotating direction of the guide wheel 4 is different from a rotating direction of the traveling wheel 501, 502. Specifically, the rotation direction of the guide wheel 4 is a horizontal direction, and the rotation direction of the traveling wheel 501, 502 is a vertical direction, so that a cooperative traveling structure of the rack 12 and the guide rail 1 is more stable.

As shown in FIGS. 1, 2, 3, 4 and 5, the stereo garage further includes a traveling motor 11. The traveling motor 11 is installed on the rack 12, and a part of traveling wheels are matched with the traveling motor 11.

The traveling motor 11 is provided to drive the traveling wheels to move. Specifically, a part of the traveling wheels are connected with a coupling, and the coupling is matched with the traveling motor 11, so that the traveling motor 11 drives the traveling wheels to rotate, and the rack 12 moves along the guide rail 1. A traveling wheel matched with the traveling motor 11 is a driving traveling wheel 502, while traveling wheels not matched with the traveling motor 11 are driven traveling wheels 501.

As shown in FIGS. 1, 2, 3, 4 and 5, the stereo garage further includes a lead-in plate 2, which is arranged on the guide rail 1, and both ends of the collector rail 3 are provided with the lead-in plate 2.

The lead-in plate 2 is arranged at both ends of the collector rail 3, and functions to guide, so that the collector brush 9 can smoothly slide to a position to contact with the collector rail 3.

Specifically, the lead-in plate 2 is provided with a lead-in groove 201, and a notch of the lead-in groove 201 is trumpet-shaped, that is, the notch of the lead-in groove 201 is an expanded opening. The notch of the lead-in groove is trumpet-shaped so that the collector brush 9 can smoothly slide into the lead-in groove 201 of the lead-in plate 2, and it can be avoided that the collector brush 9 cannot slide into the lead-in groove 201.

As shown in FIGS. 1, 2, 3, 4 and 5, the stereo garage further includes a current detector, which is electrically connected with the collector brush 9.

The current detector is provided to detect whether there is current flowing through the collector brush 9. Because when the collector brush 9 contacts with the collector rail 3, there will be current between the collector brush 9 and the collector rail 3, so it can be judged whether the collector brush 9 is in a conductive state with the collector rail 3 by providing the current detector. Specifically, the current detector can be disposed in the control box 10 so as to ensure reliability of the current detector in operation, which can play a certain protective role for the current detector and prevent damage to the current detector.

As shown in FIGS. 1, 2, 3, 4 and 5, there are two guide rails 1, and each of the guide rails 1 is provided with a plurality of collector rails 3, and each of the collector rails 3 is electrically connected with a parking mechanism.

With two guide rails 1 being arranged in a parallel state, it is sufficient to ensure stable moving of the conveyor. A plurality of parking spaces are provided at a side of each of the guide rails 1, each of the parking spaces is provided with the parking mechanism, and electrical devices of a respective parking mechanism are connected with the collector rail 3 through wires.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A powered stereo garage without cables on a parking space comprising a conveyor, at least two guide rails and a parking mechanism, the at least two guide rails being arranged in parallel, the conveyor being arranged on a guide rail of the at least two guide rails, and the parking mechanism being arranged at a periphery of the guide rail, further comprising a collector brush and a collector rail, wherein the collector rail is arranged on the guide rail, the collector brush is provided on the conveyor, and the collector rail on the guide rail is electrically connected with the parking mechanism and the collector brush on the conveyor is electrically connected with a control box on the conveyor; and a lead-in plate is provided on the collector rail, and the lead-in plate is provided with a lead-in groove, and a notch of the lead-in groove is trumpet-shaped;

further comprising a current detector, wherein the current detector is electrically connected with the collector brush, and the current detector is located in the control box.

2. The powered stereo garage without cables on the parking space according to claim 1, wherein the parking mechanism comprises a guide roller assembly, and the guide roller assembly comprises a frame, a guide roller and a rollertable motor, wherein the guide roller is rotatably mounted on the frame, and two adjacent guide rollers are matched with each other by a chain and a sprocket, and the rollertable motor is matched with the guide roller.

3. The powered stereo garage without cables on the parking space according to claim 1, wherein the conveyor comprises a guide roller assembly, and the guide roller assembly comprises a frame, a guide roller and a rollertable motor, wherein the guide roller is rotatably mounted on the frame, and two adjacent guide rollers are matched with each other by a chain and a sprocket, and the rollertable motor is matched with the guide roller.

4. The powered stereo garage without cables on the parking space according to claim 1, wherein the conveyor comprises a rack and a traveling wheel, wherein the traveling wheel is rotatably mounted on the rack, and the traveling wheel is matched with the guide rail.

5. The powered stereo garage without cables on the parking space according to claim 4, wherein the conveyor comprises a guide wheel, which is rotatably mounted on the rack and is matched with the guide rail.

6. The powered stereo garage without cables on the parking space according to claim 1, wherein both ends of the collector rail are provided with the lead-in plate.

7. The powered stereo garage without cables on the parking space according to claim 1, wherein there are two guide rails, and each of the guide rails is provided with a plurality of collector rails, and each of the collector rails is electrically connected with a parking mechanism.

8. The powered stereo garage without cables on the parking space according to claim 4, wherein the conveyor comprises a guide wheel, which is rotatably mounted on the rack and is matched with the guide rail.

9. The powered stereo garage without cables on the parking space according to claim 8, wherein rotation directions of the guide wheel and the traveling wheel are different.

10. The powered stereo garage without cables on the parking space according to claim 9, wherein the rotation direction of the guide wheel is a horizontal direction and the rotation direction of the traveling wheel is a vertical direction.

* * * * *